No. 687,806. Patented Dec. 3, 1901.
D. A. WILLIAMS.
JUICE TRANSFER FOR EVAPORATING PANS.
(Application filed Apr. 13, 1901.)
(No Model.)
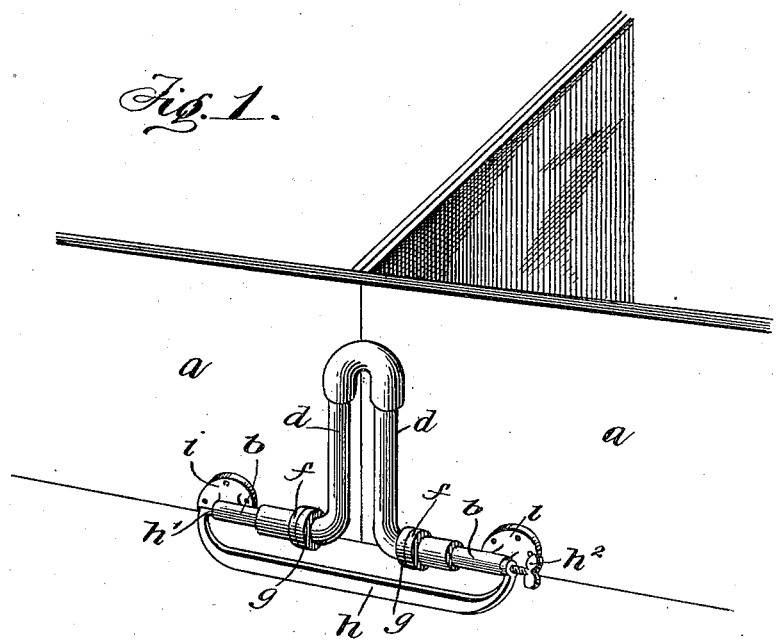
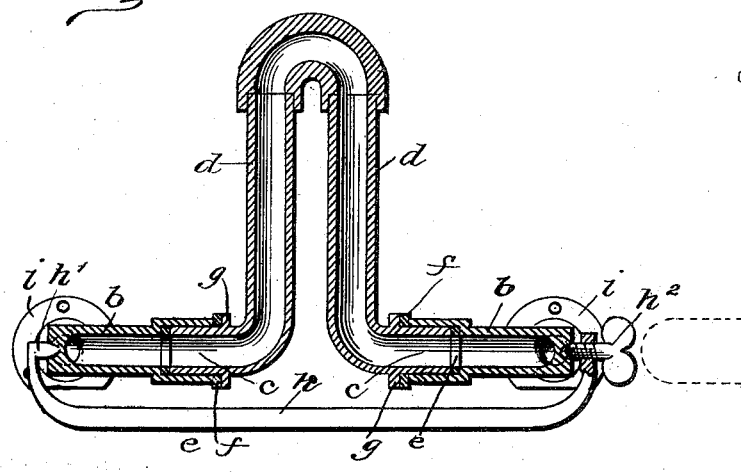
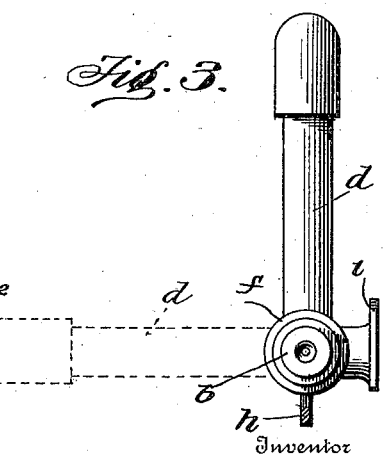
Inventor
Dudley A. Williams,
By Davis & Davis
Attorneys
Witnesses
J. H. Walmsley.
R. W. Bishop.

UNITED STATES PATENT OFFICE.

DUDLEY A. WILLIAMS, OF JEFFERSON, OHIO.

JUICE-TRANSFER FOR EVAPORATING-PANS.

SPECIFICATION forming part of Letters Patent No. 687,806, dated December 3, 1901.

Application filed April 13, 1901. Serial No. 55,740. (No model.)

*To all whom it may concern:*

Be it known that I, DUDLEY A. WILLIAMS, a citizen of the United States of America, residing at Jefferson, in the county of Ashtabula, in the State of Ohio, have invented certain new and useful Improvements in Juice-Transfers for Evaporating-Pans, of which the following is a specification.

This invention has reference to that class of transfer-pipes for evaporating-pans which embrace a U-shaped pipe or connection pivotally connected to tubular parts carried by the respective pans and adapted to be turned up to a vertical position to shut off communication between the two pans and to be swung down to put the pans into communication, as more fully hereinafter set forth.

Referring to the drawings annexed, Figure 1 is a perspective view of my device applied to evaporating-pans; Fig. 2, a vertical sectional view of the device detached, and Fig. 3 an end elevation.

Referring to the drawings by reference-letters, $a$ designates the ends of adjacent evaporating-pans. Bolted or otherwise secured to the exterior of each pan at its lower edge is an elbow-casting $b$, which is in communication with the interior of the pan through an opening in the wall thereof. One branch of each of the elbows projects from the side of the pan and the other branch lies substantially parallel with the side and the lower edge of the pan. These horizontal branches of the two elbows extend toward each other and are slightly enlarged at their open ends to receive the respective horizontal outward-extending nipples $c$ of the U-shaped pipe $d$. The respective nipples $c$ extend into the horizontal branches of the respective elbows nearly to the shoulders formed by their respective enlargements, and between the respective shoulders and the respective ends of the nipples is a packing-ring $e$, and to further pack each of these joints and render them liquid-tight another packing-ring $f$ is introduced between the end of the horizontal branch of the elbow and a shoulder $g$, formed externally on the nipple. Thus mounting the U-shaped pipe $d$ gives it a swivel telescopic connection with the rigid elbows and enables it to be turned up to the position shown in full lines or swung down to the position shown in dotted lines in Fig. 3, and to keep the joints tight a yoke $h$ is employed, this yoke having one end $h'$ pointed and rounded to engage in a depression $i$, formed in the closed end of one of the horizontal branches of one of the elbows, and its other arm provided with a pointed clamp-screw $h^2$, adapted to enter a similar recess or depression in the closed end of the other elbow, whereby by screwing up the set-screw the parts may be drawn tightly together and kept from leaking.

When it is desired that the liquid should pass from one pan into the other, it is simply necessary to turn the U-pipe down to the position shown in dotted lines in Fig. 3, and when it is desired to cut off communication between the two pans the U-pipe is turned up, as shown in full lines. When it is desired to disconnect the U-pipe from the elbows for the purpose of cleaning the connection or renewing the washers, this may be readily done by simply unscrewing the set-screw $h^2$ and removing the yoke. An important feature lies in so mounting the U-pipe that its swiveled nipples shall have comparatively long bearings and may be easily kept liquid-tight and detached whenever desired. It will be noted, further, that by employing an external clamping device, as a yoke, there will be nothing to restrict the area of the connecting or transfer pipes and no unnecessary openings or joints to work loose and leak.

Having thus fully described my invention, what I claim, and desire to secure by Letters Patent, is—

In combination with a pair of adjacent evaporating-pans, of a transfer device comprising an elbow attached to each pan and having a horizontal branch closed at one end and open at its other end, a U-pipe having horizontal oppositely-extending nipples or branches having telescopic and swivel connection with the respective open ends of the elbows, packing-rings in said connections, and an external clamping device for drawing the parts together.

In testimony whereof I hereunto affix my signature, in the presence of two witnesses, this 2d day of April, 1901.

DUDLEY A. WILLIAMS.

Witnesses:
ALVIN C. WHITE,
E. W. HUNT.